US009061775B2

(12) United States Patent
Ross et al.

(10) Patent No.: US 9,061,775 B2
(45) Date of Patent: Jun. 23, 2015

(54) METHOD AND APPARATUS FOR SPACECRAFT ATTITUDE CONTROL USING POLYNOMIAL INTERPOLATION

(71) Applicants: Isaac M. Ross, Monterey, CA (US); Mark Karpenko, Marina, CA (US)

(72) Inventors: Isaac M. Ross, Monterey, CA (US); Mark Karpenko, Marina, CA (US)

(*) Notice: Subject to any disclaimer, the term of this patent is extended or adjusted under 35 U.S.C. 154(b) by 132 days.

(21) Appl. No.: 13/924,969

(22) Filed: Jun. 24, 2013

(65) Prior Publication Data

US 2014/0379176 A1 Dec. 25, 2014

Related U.S. Application Data

(60) Provisional application No. 61/663,190, filed on Jun. 22, 2012.

(51) Int. Cl.
*B64G 1/24* (2006.01)

(52) U.S. Cl.
CPC .......................................... *B64G 1/24* (2013.01)

(58) Field of Classification Search
None
See application file for complete search history.

(56) References Cited

U.S. PATENT DOCUMENTS

| | | | |
|---|---|---|---|
| 4,663,726 A | | 5/1987 | Chand et al. |
| 5,949,695 A | * | 9/1999 | Snell .............................. 708/290 |
| 6,039,290 A | | 3/2000 | Wie et al. |
| 6,154,691 A | * | 11/2000 | Bailey .............................. 701/13 |
| 6,305,647 B1 | * | 10/2001 | Defendini et al. ............. 244/165 |
| 6,454,217 B1 | * | 9/2002 | Rodden et al. ................. 244/164 |
| 6,473,475 B1 | * | 10/2002 | Putzeys .......................... 375/350 |
| 6,860,451 B1 | * | 3/2005 | Wang .............................. 244/164 |
| 7,693,619 B2 | * | 4/2010 | Elgersma et al. ............... 701/13 |
| 7,795,566 B2 | * | 9/2010 | Koenig .......................... 244/3.15 |
| 8,140,198 B1 | | 3/2012 | Koenig |
| 8,380,370 B2 | * | 2/2013 | Liu et al. ......................... 701/13 |
| 8,612,192 B2 | * | 12/2013 | Larsson et al. ..................... 703/8 |
| 8,880,246 B1 | * | 11/2014 | Karpenko et al. ............... 701/13 |
| 2004/0098178 A1 | * | 5/2004 | Brady et al. ....................... 701/4 |
| 2004/0140400 A1 | * | 7/2004 | Goodzeit et al. ............... 244/164 |
| 2005/0010337 A1 | * | 1/2005 | Li et al. ........................... 701/13 |
| 2005/0027407 A1 | * | 2/2005 | Holt et al. ......................... 701/4 |
| 2005/0071055 A1 | * | 3/2005 | Needelman et al. ............ 701/13 |
| 2005/0133671 A1 | * | 6/2005 | Wang et al. .................... 244/170 |
| 2006/0022091 A1 | * | 2/2006 | Peck et al. ..................... 244/165 |
| 2007/0023579 A1 | * | 2/2007 | Wang et al. ................. 244/158.6 |
| 2008/0046138 A1 | * | 2/2008 | Fowell et al. .................... 701/13 |
| 2009/0039202 A1 | * | 2/2009 | Ogo et al. ..................... 244/165 |
| 2009/0157236 A1 | * | 6/2009 | Van Gaasbeck et al. ......... 701/3 |
| 2010/0019092 A1 | * | 1/2010 | Liu et al. ....................... 244/170 |

(Continued)

OTHER PUBLICATIONS

Berrut, J-P., et al. "Barycentric Lagrange Interpolation," SIAM Review, 46(3), pp. 501-517, 2004.

(Continued)

*Primary Examiner* — Jonathan M Dager
(74) *Attorney, Agent, or Firm* — Renner, Otto, Boisselle & Sklar, LLP.

(57) ABSTRACT

A method, apparatus and system is provided for reducing an amount of information transmitted to a vehicle in order to implement attitude control of the vehicle. In accordance with the present invention, data corresponding to at least one time-varying attitude command trajectory defining an attitude of the vehicle is reduced, for example, into a vector of polynomial coefficients. The vector of polynomial coefficients then are transmitted to the vehicle, where they are used to reconstruct the at least one time-varying attitude command trajectory via a polynomial interpolation operation.

18 Claims, 9 Drawing Sheets

(56) References Cited

U.S. PATENT DOCUMENTS

| | | | |
|---|---|---|---|
| 2010/0152953 A1* | 6/2010 | Hamilton | 701/29 |
| 2010/0250031 A1* | 9/2010 | Paschall et al. | 701/8 |
| 2011/0024571 A1* | 2/2011 | Tsao et al. | 244/171 |
| 2012/0097797 A1* | 4/2012 | Woo et al. | 244/158.6 |

OTHER PUBLICATIONS

Karpenko, M., et al. "Design and Flight Implementation of Operationally Relevant Time-Optimal Spacecraft Maneuvers," Proceedings of the AAS/AIAA Astrodynamics Specialist Conference, Jul. 31-Aug. 4, 2011, Girdwood, AK, AAS paper 11-586.

Karpenko, M., et al. "First Flight Results on Time-Optimal Spacecraft Slews," Journal of Guidance Control and Dynamics, 35(2), pp. 367-376, 2012.

Ross, I. M. and Karpenko, M., "A Review of Pseudospectral Optimal Control: From Theory to Flight," Annual Reviews in Control, 36(2), pp. 182-197, 2012.

Wie, B. et al. "Quaternion Feedback Regulator for Spacecraft Eigenaxis Rotations," Journal of Guideance Control and Dynamics, 12(3), pp. 375-380, 1989.

* cited by examiner

US 9,061,775 B2

METHOD AND APPARATUS FOR SPACECRAFT ATTITUDE CONTROL USING POLYNOMIAL INTERPOLATION

REFERENCE TO RELATED APPLICATION

This application claims priority to and the benefit of U.S. Provisional Patent Application Ser. No. 61/663,190, filed Jun. 22, 2012, and entitled "METHOD FOR REDUCING BUFFER STORAGE REQUIREMENTS FOR IMPLEMENTATION OF SPACECRAFT ATTITUDE CONTROL MANEUVERS", the entirety of which is hereby incorporated by reference.

TECHNICAL FIELD

The present invention relates generally to spacecraft attitude control using, for example, any combination of reaction wheels, control moment gyroscopes, magnetic torque rods, or thrusters. More particularly, the present invention relates to an apparatus, system and method for generating attitude command trajectories that require less storage space on board a spacecraft, and for providing real time determination of a continuum of attitude command trajectories.

BACKGROUND ART

In order to successfully implement mission requirements, many spacecraft require active control of the attitude or orientation of the spacecraft body. For instance, an imaging satellite typically utilizes an optical sensor to collect data from regions of interest to the spacecraft operator. In many cases, the imaging sensor is fixed rigidly or semi-rigidly to the spacecraft body. Therefore, in order to align the imaging sensor it is necessary to rotate the entire spacecraft. This method of operation is also common amongst space telescopes such as the Hubble Space Telescope in which the entire spacecraft is maneuvered in order to point the telescope optics and observe an object.

The desired orientation of a spacecraft may be specified in a number of different ways including single-valued functions of time, also known as a step input, or as a set of maneuver command trajectories, in which the desired spacecraft attitude varies as a function of time. Conventionally, maneuver command trajectories have been generated directly on-board the spacecraft by implementing a so-called command generator as part of the spacecraft flight control software. One advantage of utilizing an on-board command generator is that attitude command inputs can be easily computed at a rate that is consistent with the sampling rate of the attitude control system. This action prevents large discontinuities in the command trajectory from one sample time to the next and helps to attenuate or prevent the excitation of flexible modes inherent of the spacecraft structure or payload.

In order to generate a trajectory of spacecraft attitude commands, the command generator can read a time-tagged desired attitude setpoint from a storage buffer, also located on the spacecraft. The time-tagged desired attitude setpoint is uplinked to the spacecraft from a ground station by the spacecraft operator. After reading the desired attitude setpoint from the storage buffer, the onboard maneuver generator is utilized to construct a trajectory between the current spacecraft position and the desired final position. The trajectory can be a straight line, or any curve.

SUMMARY OF INVENTION

A distinct disadvantage of utilizing an onboard command generator to compute attitude command trajectories is that it is extremely costly, and sometimes physically impossible, to modify the type of trajectory that is produced by the logic embedded within the spacecraft flight software. For example, many spacecraft implement what are known as Eigen axis rotations, in which the maneuver between two orientations follows a circular arc. Once this logic is embedded within the flight software, it is not possible to produce any type of maneuver trajectory other than the Eigen axis rotation, although other types of maneuvers may be advantageous under certain circumstances. Thus, a need remains for improved techniques and associated apparatus that allow for a variety of different types of maneuvers to be efficiently implemented to control the attitude of a spacecraft.

The present disclosure provides a method, apparatus and system for reducing, transmitting, and reconstructing any feasible command trajectory for attitude control of spacecraft. The inventive method, apparatus and system obviate the need for implementing a conventional onboard command generator as part of the spacecraft flight software. Such feasible command trajectories, which may be generated, for example, using a ground-based system, can be any curves that enable the spacecraft to maneuver between any starting orientation and desired final orientation(s) without exceeding operational constraints or hardware limitations. The method, apparatus and system described in the present disclosure provide a significant advance over conventional techniques in which command trajectories of a predefined nature are generated onboard a spacecraft and/or in which feasible attitude command trajectories sampled at rates of a servo controller or of an attitude controller are transmitted to a spacecraft or are stored in a memory element on board a spacecraft. The inventive method, apparatus and system also provide a means by which to bypass a conventional onboard command generator by incorporating an embodiment of the invention as part of an existing spacecraft attitude control system. In doing so, the method, apparatus and system provided by the present disclosure enables the spacecraft to perform any feasible maneuver as selected by a spacecraft operator or other ground-based maneuver generator. Consequently, the method, apparatus and system enable additional capability to be utilized in the operation of a spacecraft without adding cost or complexity to existing spacecraft attitude control systems.

A method in accordance with one or more aspects of the present invention enables any feasible attitude command trajectory to be reduced, transmitted and reconstructed. The method can include, for example, reducing a plurality of continuous time attitude command trajectories by accurately capturing the time-varying nature of the original time-varying command trajectories by a vector of polynomial coefficients, transmitting the vector of polynomial coefficients to a spacecraft, storing the vector of polynomial coefficients in a memory element on board a spacecraft, and reconstructing a plurality of attitude command trajectories at any desired servo controller or attitude control system sampling rate using an interpolation process that utilizes the stored polynomial coefficients. In certain embodiments, the dimension of the vector of polynomial coefficients obtained through the reduction process is significantly more compact than by sampling the original command trajectories at servo or attitude controller rates. Because the entire time-history of the command trajectories is encoded and stored within the vector of polynomial coefficients provided by the method in accordance with the present invention, the efficiency of transmitting and storing any maneuver trajectory generated by a ground-based, or any other system disjoint from the spacecraft, is greatly enhanced. Improving the efficiency of transmitting and storing any maneuver trajectory is advantageous because the amount of command storage capacity of a spacecraft and/or the bandwidth of the communications interface of a spacecraft is generally limited. In addition, samples of the maneuver trajectory can be reconstructed from the stored vector of polynomial coefficients at any desired rate in order to avoid discontinuities that can produce impulsive rates, accelerations or jerks on the spacecraft body. In certain embodiments, the method in accordance with the present invention can be implemented alongside a conventional onboard maneuver generator to enhance the capabilities of a spacecraft attitude control system.

An apparatus and system for reducing, transmitting, storing, and reconstructing spacecraft command trajectories is provided in accordance with further aspects of the present disclosure. The apparatus and system may include one or more processors configured to receive a time-varying command trajectory. The one or more processors may be further configured to reduce the time-varying command trajectory into a vector of polynomial coefficients based on additional input provided by any user (e.g., a tolerance for an acceptable polynomial approximation error, a particular set of polynomial basis functions b(t) used to approximate the command trajectories, a number N of coefficients for approximating the command trajectories, a set of distinct time points or nodes, time histories of spacecraft attitude commands, an initial maneuver time and an end maneuver time, etc.), and to provide as an output, a vector of polynomial coefficients for transmission to a spacecraft over a communications link. A second processor or collection of processors may also be configured to store a received vector or vectors of polynomial coefficients in block of memory, to retrieve a vector or vectors of polynomial coefficients from a block of memory, to reconstruct a time-varying command trajectory or a plurality of time-varying command trajectories based on values of polynomial coefficients using an appropriate interpolation process, and to provide as an output, samples of a plurality of reconstructed command trajectories at any arbitrary sampling rate for use as inputs to an attitude controller or to actuators of a spacecraft. In reconstructing the time-varying command trajectories, the second processor may base the reconstruction on one or more of an initial maneuver time and an end maneuver time, an attitude control system sample time, a clock time, a set of mathematical basis functions, or a set of distinct time points or nodes.

Computer readable mediums are also provided, including computer executable instructions for reducing, storing, transmitting, and reconstructing spacecraft attitude command trajectories according to the described methods.

According to one aspect of the invention, a command reduction module for generating a reduced data set corresponding to a time-varying attitude command trajectory includes circuitry configured to: receive at least one time-varying attitude command trajectory defining an attitude of the vehicle, and reduce the at least one time-varying attitude command trajectory into a vector of polynomial coefficients.

According to one aspect of the invention, the circuitry configured to reduce the at least one time-varying attitude command trajectory into the vector polynomial coefficients is configured to perform the reduction based on a user input.

According to one aspect of the invention, the user input comprises at least one of an initial maneuver time or an end maneuver time for the vehicle, time histories of vehicle attitude commands, a predetermined number N (where N is an integer) of polynomial coefficients to compute, a tolerance for an acceptable polynomial approximation error, a set of mathematical basis functions b(t), or a set of distinct time points or nodes.

According to one aspect of the invention, the circuitry is configured to generate a maneuver to minimize or maximize an objective function.

According to one aspect of the invention, the circuitry is configured to reduce the at least one time-varying attitude command trajectory is configured to expand N+1 mathematical basis functions b(t) over a selected time grid, compute the values of a set of polynomial coefficients c for N+1 basis functions, and evaluate the infinity norm, wherein N is a non-negative integer.

According to one aspect of the invention, the circuitry is configured to reduce the at least one time-varying attitude command trajectory is configured to compare the evaluated infinity norm to a predetermined tolerance, and when the evaluated infinity norm is greater than the predetermined tolerance, increment N and repeat the expansion, computation and evaluation steps, and when the evaluated infinity norm is less than the predetermined tolerance, conclude that the reduction process is complete.

According to one aspect of the invention, the at least one time-varying attitude command trajectory is represented in the form, $$y^N(t) = \sum_{j=0}^{N} c_j b_j(t),$$

where $y^N(t)$ is an approximation of the at least one time-varying attitude trajectory having arbitrary accuracy, N is an integer representing a number N+1 of basis functions, $b_j(t)$ denotes the $j^{th}$ basis function, and $c_j$ is a polynomial coefficient for the $j^{th}$ basis function.

According to one aspect of the invention, values of the coefficients $c_j$ are selected to minimize the infinity norm, $$\|y(t) - y^N(t)\|_\infty = \left\| y(t) - \sum_{j=0}^{N} c_j b_j(t) \right\|_\infty \leq \varepsilon,$$

where $\varepsilon$ is a maximum tolerance on polynomial approximation error, and y(t) is the original time-history of the at least one time-varying attitude command trajectory.

According to one aspect of the invention, the circuitry is configured to utilize Lagrange interpolating polynomials, $$b_j(t) = \sum_{i=0, i \neq j}^{N} \frac{t - t_i}{t_j - t_i},$$

as the basis functions.

According to one aspect of the invention, the circuitry is configured to utilize a Gaussian time grid, for example, a Legendre-Gauss-Lobatto grid or other systems of time points comprising a non-uniform distribution of time points clustered at the boundaries of the interval of approximation, i.e., clustered near an initial maneuver time and/or an end maneuver time.

According to one aspect of the invention, a command reconstruction module for generating data corresponding to a time-varying attitude command trajectory includes circuitry configured to: receive a vector of polynomial coefficients; and reconstruct at least one time-varying attitude command trajectory by utilizing the vector of polynomial coefficients and an affine transformation to perform a polynomial interpolation operation.

According to one aspect of the invention, the circuitry configured to reconstruct the at least one time-varying attitude command trajectory is configured to perform the reconstruction based on at least one of an initial maneuver time for the vehicle, an end maneuver time for the vehicle, an attitude control system sample time, a clock time of the vehicle control system, a set of mathematical basis functions, or a set of distinct time points or nodes.

According to one aspect of the invention, the circuitry configured to reconstruct the at least one time-varying attitude command trajectory is configured to use Lagrange polynomials as the basis functions $b_j(t)$.

According to one aspect of the invention, the circuitry configured to reconstruct the at least one time-varying attitude command trajectory is configured to map a current sample time to interval $[-1, +1]$ via an affine transform.

According to one aspect of the invention, the circuitry configured to reconstruct the at least one time-varying attitude command trajectory is configured to perform polynomial interpolation using the vector of polynomial coefficients and the equation $$y^N(t) = \sum_{j=0}^{N} c_j b_j(t),$$

where N is an integer representing a number N+1 of basis functions, $b_j(t)$ is the $j^{th}$ basis function, and $c_j$ is polynomial coefficient for the $j^{th}$ basis function.

According to one aspect of the invention, the circuitry configured to reconstruct the at least one time-varying attitude command trajectory is configured to perform Barycentric polynomial interpolation using the vector of polynomial coefficients and the equation $$y^N(t) = \ell(t) \sum_{j=0}^{N} \frac{w_j}{t - t_j} c_j,$$

where t is time, $t_j$ is a $j^{th}$ time point, $w_j$ is a Barycentric weight for the $j^{th}$ time point, $c_j$ is the $j^{th}$ polynomial coefficient, and N is an integer representing a number N+1 of basis functions and l(t) is the quantity $l(t)=(t-t_0)(t-t_1) \ldots (t-t_N)$.

According to one aspect of the invention, a vehicle guidance system for implementing attitude control of a vehicle includes the command reduction module and the command reconstruction module described herein.

According to one aspect of the invention, the system includes a first communication interface located remote from the vehicle and a second communication interface located on the vehicle, the first communication interface configured to transmit the vector of polynomial coefficients to the second communication interface.

According to one aspect of the invention, the system includes an attitude control system including an input for receiving a command trajectory; and a switching device including an input cooperatively coupled to the command reconstruction module, and an output operatively coupled to the attitude control system input, the switching device configured to selectively provide the reconstructed time-varying attitude command trajectory to the attitude control system input.

According to one aspect of the invention, a method for implementing attitude control of a vehicle includes: receiving at a location remote from the vehicle data corresponding to at least one time-varying attitude command trajectory defining an attitude of the vehicle; and using circuitry of a command reduction module located remote from the vehicle to reduce the at least one time-varying attitude command trajectory into a vector of polynomial coefficients.

According to one aspect of the invention, the method includes receiving at the vehicle the vector of polynomial coefficients; and using circuitry of a command reconstruction module to reconstruct the at least one time-varying attitude command trajectory by utilizing the vector of polynomial coefficients and an affine transformation to perform a polynomial interpolation operation.

According to one aspect of the invention, performing a polynomial interpolation operation includes mapping a current sample time to interval $[-1, +1]$ via an affine transform and using Barycentric interpolation.

According to one aspect of the invention, a computer program embodied on a non-transitory medium comprising computer instructions executable by a processor, the computer instructions adapted to cause the processor to carry out the steps according to the method described herein.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The following description and drawings set forth certain illustrative implementations of the disclosure in details, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings. In the annexed drawings, like references indicate like parts or features.

DETAILED DESCRIPTION OF INVENTION

Figure 1:
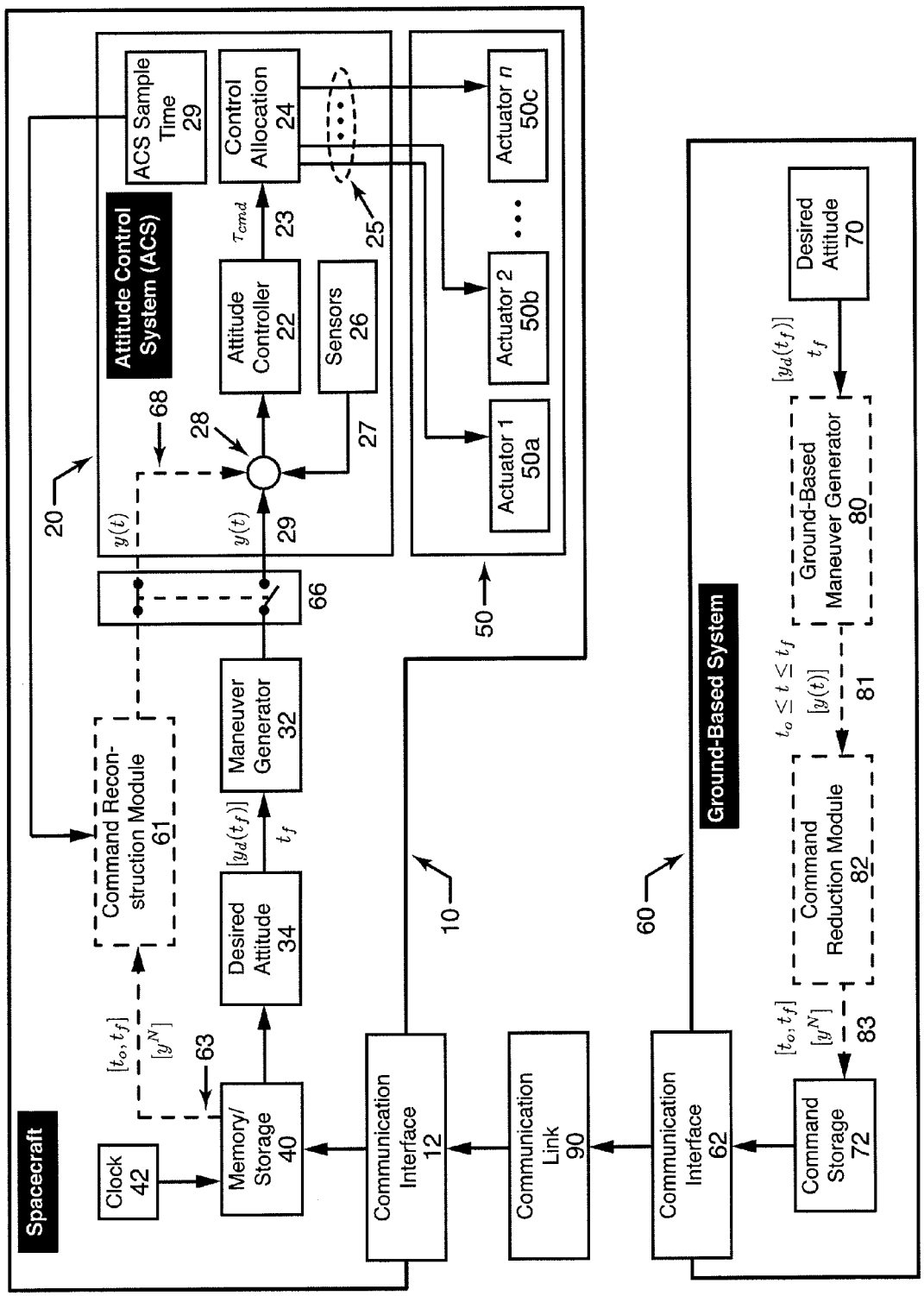
FIG. 1 is a block diagram of a system illustrating an exemplary spacecraft with an attitude control system and a ground-based system having apparatus for reducing, transmitting and reconstructing attitude maneuver trajectories in accordance with one or more aspects of the present disclosure.

Referring to FIG. 1, an exemplary spacecraft 10 is equipped with an attitude control system 20 having an attitude controller 22, a control allocation scheme 24 and a bank of sensors 26 for determining an attitude of the spacecraft. In order to control the attitude or orientation of spacecraft 10, attitude control system 20 generates commands to a plurality of actuators 50 that in turn produce a torque on the body of spacecraft 10. The action of actuators 50 thus effects a change in the attitude or orientation of spacecraft 10. Multiple actuators 50a, 50b, 50c are generally required since it is generally necessary to produce torque output components in three orthogonal directions to control the attitude of spacecraft 10 in any arbitrary direction. The plurality of actuators 50 may comprise a group or array of reaction wheels, a group or array of control moment gyroscopes (CMGs), a group or array of magnetic torque coils, and/or a group or array of thrusters. The role of attitude control system 20 is to operate actuators 50 by activating the actuators in a manner that decreases any errors between the spacecraft attitude command trajectory 29 or 68 and the actual spacecraft attitude 27. Actual spacecraft attitude 27 is determined using sensors 26 that measure the spacecraft angular rate and/or other variables to compute the spacecraft attitude. A filter (not shown) may also be implemented to smooth out and/or perform sensor fusion operations on the raw sensor data. Attitude command trajectory 29 or 68 is compared to the measured spacecraft attitude 27 at summing node 28. By taking the difference between the desired 29 or 68 and actual attitude angles 27, which may be expressed in a variety of forms including Euler angles, quaternions, Gibbs parameters or any other convenient way of expressing the attitude of the spacecraft, attitude control system 20 computes an error signal that is then filtered by attitude controller 22 to produce a vector of torque command components $\tau_{cmd}$ 23 generally given in three orthogonal directions. Other signals, for example, attitude rates and/or attitude accelerations, could also be utilized by attitude control system 20 to generate error or feedforward signals as inputs to attitude controller 22. A vector of torque command components 23, generally expressed in the spacecraft body fixed frame, is then processed by control allocation block 24 in order to map commanded torques 23 to a vector of command signals 25 for each of n actuators 50. Those of ordinary skill in the art sometimes also refer to control allocation block 24 as a steering law or torque allocation matrix. By way of control allocation block 24, attitude controller 22 can drive a set of actuators 50 in a way that decreases the attitude error calculated at summing node 28.

Conventionally, attitude command trajectory 29 has been calculated onboard the spacecraft by onboard maneuver generator 32. Onboard maneuver generator 32 computes an attitude command trajectory 29 according to predefined control logic in order to transition the attitude of spacecraft 10 from an initial or current orientation to a desired orientation specified by an operator of spacecraft 10. A desired attitude 34 may be specified in terms of angular positions and/or may be represented as angular speeds, acceleration values or any combination thereof. Desired attitude 34 may be time-tagged and read from a memory or storage element 40 when a time-tag becomes current as determined by evaluating the output of spacecraft clock 42. When any time-tagged attitude setpoint becomes current, the desired attitude angles, desired angular rates, desired maneuver completion time and any other parameters required by onboard maneuver generator 32 are read out of memory block 40 and used by maneuver generator 32 in order to compute an attitude command trajectory 29 for attitude control system 20 to follow.

Spacecraft 10 also has an onboard communications interface 12 that can be utilized to load one or more time-tagged attitude setpoints into memory block 40. In general, the storage capacity of memory block 40 may be limited so a means of reducing the amount of data to be stored in memory block 40 may be used advantageously in operating spacecraft 10. Time-tagged attitude setpoints are transmitted from a system remote to the spacecraft, such as ground-based system 60, over an appropriate communication link 90. Although reference is made here to a "ground-based" system 60, this is merely exemplary. The system 60 could be part of an aircraft, watercraft, or even another spacecraft separate and remote from the spacecraft 10.

Referring now back to ground-based system 60, time-tagged attitude setpoints 70 may be specified by an operator of the spacecraft or generated automatically by an automated supervisory or planning system (not shown). A series of time-tagged attitude setpoints may be stored local to ground-based system 60 in, for example, a command storage module 72 (e.g., volatile or non-volatile memory, such as RAM, flash RAM, magnetic-based memory, etc.). Stored commands 72 may then be readout by communication interface 62 and transmitted to the spacecraft command storage buffer 40 over communications link 90. In general, the bandwidth of communications link 90 may be limited so a means of reducing the amount of data to be transmitted using link 90 to spacecraft 10 may be used advantageously in operating spacecraft 10.

The method, apparatus and system in accordance with the present invention provide a means for reducing an attitude command trajectory, transmitting the reduced attitude command trajectory to a spacecraft, and reconstructing the reduced attitude command trajectory at the spacecraft. As used herein, the term "reducing" is defined as encoding any time-varying attitude command trajectory by a set of polynomial coefficients to enable numerical data pertaining to the time-history of a time-varying attitude command trajectory to be efficiently and advantageously compressed by a set of polynomial coefficients. Further, as used herein, the term "reconstructing" is defined as determining the time-history of any time-varying attitude command trajectory described by a set of polynomial coefficients so that the resulting decompressed attitude command trajectory may be sampled at any arbitrary time during the span of the associated attitude maneuver and utilized as an input to a spacecraft attitude control system.

For example, an attitude command trajectory 81 can be computed by a conventional remote maneuver generator, such as a ground-based maneuver generator 80. The attitude command trajectory 81 may be computed according to any control logic capable of generating an attitude command profile to transition the attitude of spacecraft 10 from an initial or current orientation to a desired orientation 70. Output 81 of command generator 80 is normally a vector or several vectors describing attitude command trajectories y(t) that provide curves for transitioning spacecraft 10 from some initial attitude to a desired final attitude.

Output 81 of maneuver generator 80 is then provided to the input of a command reduction module 82 of ground-based system 60. Command reduction module 82 includes hardware and/or software configured to reduce a vector of attitude command trajectories 81 into a vector of data 83 including, in general, a set of polynomial coefficients as well as the begin and end times for an attitude maneuver. Advantageously, data 83 have a reduced dimension as compared to attitude command trajectories 81. As used herein, the term "reduced dimension" refers to the compression of attitude command trajectories 81 by the process, in accordance with the present invention, of determining a set of polynomial coefficients that have the effect of removing non-essential information from the description of attitude command trajectories 81. The set of polynomial coefficients and the attitude maneuver begin and end times obtained in accordance with the present invention are stored in command storage block 72 and subsequently transmitted over link 90 to spacecraft 10 for implementation. In the preferred embodiment in accordance with the present invention, command reduction block 82 encodes or compresses information contained in attitude command trajectories 81 as a vector of polynomial coefficients that are referenced to a predetermined time grid. Using the values of the polynomial coefficients and the predetermined time grid, the original attitude command trajectory can be reconstructed or decompressed to an accuracy specified by the user of the process.

In order to execute a maneuver computed at ground-based system 60 using maneuver generator 80, a vector of polynomial coefficients and additionally a vector of maneuver begin and end times 83 may be stored at the ground-based system 60 using storage block 72. The vector of maneuver begin and end times may be appended to the vector of polynomial coefficients if desired by a user of the process. When a number of maneuvers have been reduced and stored in this way, vectors of polynomial coefficients and vectors of maneuver begin and end times may be transmitted via communications interface 62 over communications link 90 to spacecraft 10. Upon arriving at spacecraft 10, communications interface 12 then routes the transmitted data to spacecraft memory element 40 (e.g., volatile and/or non-volatile memory) where the reduced attitude command trajectories are stored until required for execution of each maneuver.

When it is determined, via spacecraft clock 42, that a maneuver should be executed, the relevant vector of polynomial coefficients 63 is read from spacecraft memory 40 by command reconstruction module 61. Command reconstruction module 61 contains hardware and/or software for reconstructing any maneuver generated by ground-based maneuver generator 80 into a command trajectory 68 suitable for execution by attitude control system 20. Additionally, command reconstruction module 61 can output an attitude command 68 (e.g. a four-dimensional quaternion vector) at any sample time 29 as determined by the requirements of attitude control system 20. Command trajectory 68 is reconstructed by command reconstruction module 61 by utilizing a vector of polynomial coefficients and an affine transformation to perform a polynomial interpolation operation. Additionally, a switching apparatus 66, which may be realized in either a software or hardware or a combination thereof, can be employed to allow command reconstruction module 61 to be implemented alongside any existing onboard maneuver generator 32 that may already be present as part of spacecraft 10. Switch 66 can be activated by an additional hardware or software module (not shown) in order to connect command reconstruction module 61 to attitude control system 20. The action of switch 66 enables the function of existing onboard maneuver generator 32 to be bypassed so that command reconstruction module 61 may be used advantageously to implement an attitude maneuver.

A benefit of utilizing the command reduction process provided by command reduction module 82 in conjunction with command reconstruction process provided by command reconstruction module 61 is that more sophisticated means of generating spacecraft guidance and control commands can be employed to operate spacecraft 10. In one embodiment, command trajectories can be generated using maneuver generator 80 to optimize aspects of the spacecraft performance, such as minimizing the maneuver time or energy consumption or other aspects of performance that cannot be improved or modified by sole use of onboard command generator 32. Moreover, due to the complexities involved in the computation of such optimized command trajectories, it may not even be possible to compute optimized attitude command trajectories at update rates required for smooth computation of the attitude control law 22 or at the servo rates required for operation of actuators 50. In such a case, attitude command trajectories may be computed off-line using a system 60 remote from the spacecraft 10, including ground-based maneuver generator 80 and command reduction module 82. Optimized attitude command trajectories 81 computed by ground-based maneuver generator 80 are generally specified in the form of a plurality of time-tagged attitude trajectories. The series of time-tagged attitude trajectories 81 and their derivatives and/or any feed-forward terms may then be transmitted to spacecraft 10 and stored in memory element 40. If the sample rate 29 of attitude control system 20 is faster than the sample rate of attitude command trajectories 81 produced by the ground-based maneuver generator 80 and/or command reduction module 82, intermediate points may need to be calculated by command reconstruction module 61 between each of the stored attitude values for implementation of the attitude maneuver trajectory 68.

One scheme for generating intermediate points between two successive attitude values is to use a sample and hold mechanism, whereby the values of the desired attitude are held at their previous values until the time when the next setpoint becomes current as determined by the output of spacecraft clock 42. When the next setpoint becomes current, its values are read form the memory buffer 40 and the values of the held setpoints are updated at the command reconstruction module 61 and fed into summing node 28.

An issue associated with using a simple sample and hold mechanism to generate intermediate points at sample rate 29 between two successive setpoints stored at memory buffer 40 is that a discontinuity is produced at each instant that the setpoint is updated. Such discontinuities can cause the actual spacecraft response to deviate from the desired response 81 as calculated by the ground-based maneuver generator 80. In addition, discontinuities can produce impulsive rates, accelerations or jerks on the spacecraft body that, in turn, can excite spacecraft structural flexibilities and/or damage delicate electronics and instruments.

The deleterious effects of discontinuities at the input to summing node 28 can be minimized by generating (using maneuver generator 80) and storing (using command storage block 72) time-tagged attitude commands directly at ACS sample times 29. This approach, however, demands significant command storage requirements at memory element 40. Moreover, since the command sequence is generated off-line at ground-based system 60, the entire sequence of time-tagged attitude setpoints must be uplinked to the spacecraft over communications link 90. The bandwidth required to transmit the command trajectories via 90 and/or the command storage requirements may not be achievable and thus an attitude command trajectory may become infeasible for implementation.

The method, apparatus and system in accordance with the present disclosure thus provides for command reduction module 82 that can reduce or compress a plurality of guidance or attitude control command trajectories 81 to a set of control points or polynomial coefficients 83. By reducing the dimension of the attitude command trajectory 81 to a vector of polynomial coefficients 83, the bandwidth and space requirements for transmission and storage of advanced spacecraft guidance and control commands is significantly reduced. Hardware and/or software may also be provided in the command reconstruction module 61 to reconstruct attitude command trajectory 81 at any desired frequency 29 with an accuracy tolerance specified by an operator of the process. The method, apparatus and system in accordance with the present invention thus provide a means for spacecraft guidance and control that enables guidance and control trajectories calculated by a maneuver generator 80 and subsequently reduced by the command reduction module 82 to be reproduced by the command reconstruction module 61 as closely as desired to the original calculated trajectories.

Figure 2:
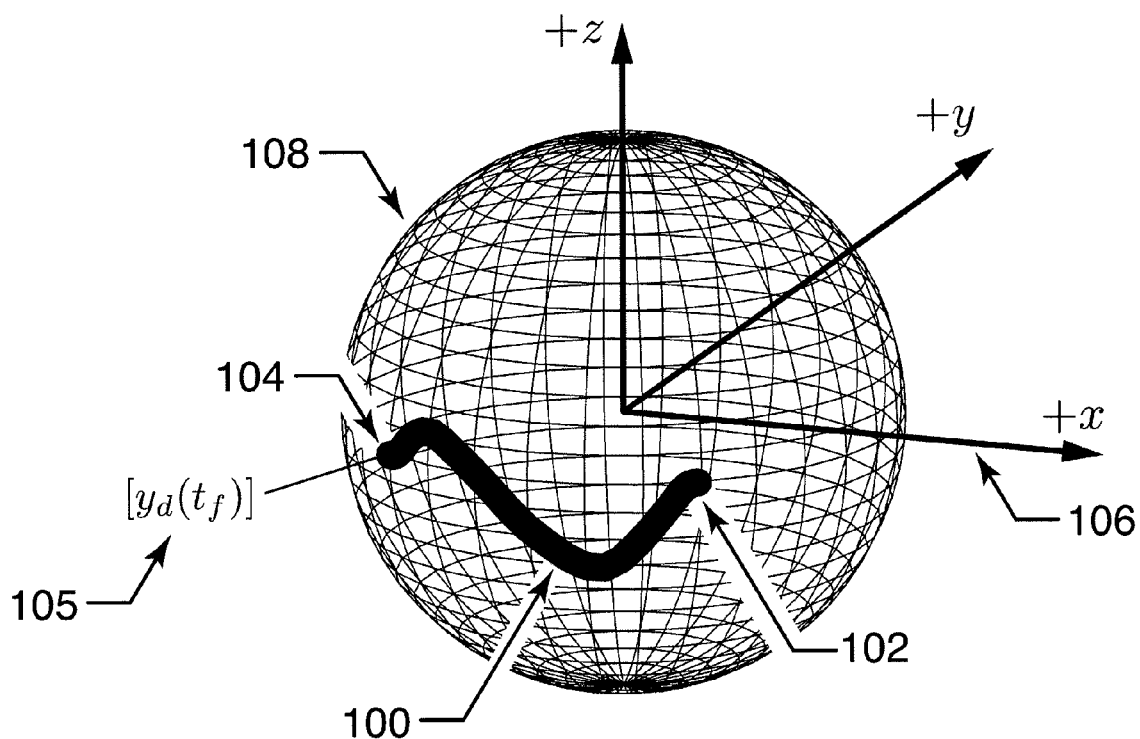
FIG. 2 illustrates an exemplary attitude maneuver that may be computed on a ground-based system and then implemented on board a spacecraft in accordance with the present disclosure.
Figure 3:
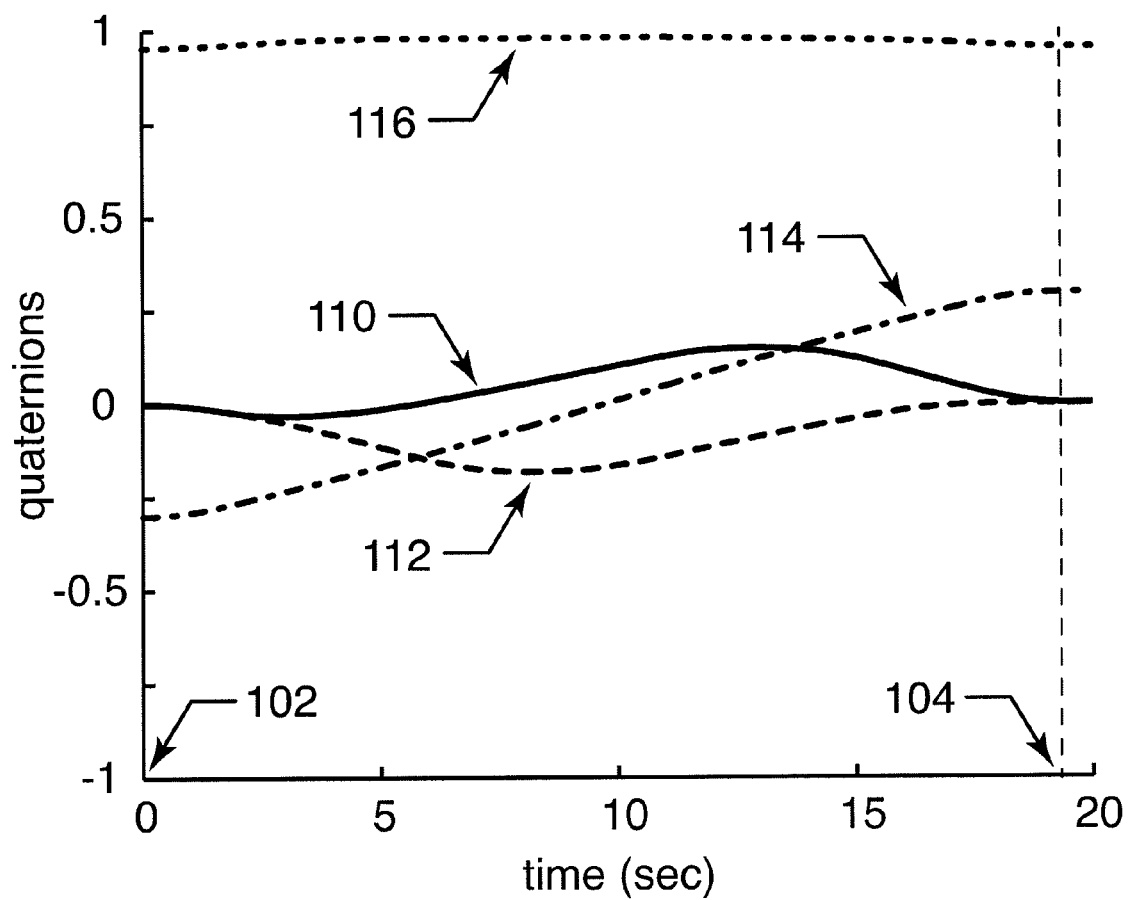
FIG. 3 provides a representation of an exemplary attitude maneuver expressed in terms of attitude quaternions.

Referring now to FIG. 2, an exemplary spacecraft attitude maneuver 100 is shown. Exemplary attitude maneuver 100 is carried out between two orientations beginning at initial time (to) 102 and ending at final time (tf) 104. For clarity, the attitude maneuver is depicted in terms of the motion of an instrument axis as a projection on sphere 108 centered about a fixed orthogonal xyz coordinate system 106. At final time 104, the attitude of spacecraft 10 is denoted by desired attitude vector $[y_d(tf)]$ 105. It is noted that the desired attitude vector $[y_d(tf)]$ 105 is independent and distinct from the y-axis of the xyz coordinate system 106 shown in FIG. 2 (i.e., the "y" of the desired attitude function is unrelated to the "y-axis"). Associated with this maneuver are the desired attitude and velocity trajectories and their higher-order time-derivatives, as well as relevant actuator command trajectories that may also be calculated by maneuver generator 80. One representation of attitude command trajectories 81 associated with exemplary attitude maneuver 100 is given in terms of quaternions 110, 112, 114 and 116 as depicted in FIG. 3 between maneuver begin time 102 and maneuver end time 104. Quaternions are a four-dimensional representation of the attitude of an object, such as spacecraft 10, in three-dimensional space and are a familiar means of representing attitude of a spacecraft for those having ordinary skill in the art. Other representations of the spacecraft attitude, such as Euler angles or Gibbs parameters, are also possible and are fully compatible with the method in accordance with the present invention.

Attitude command trajectories generated by the maneuver generator 80 can be viewed as a plurality of signals 81 in either discrete or continuous time. Signals 81 may be reduced or compressed to a finite set of coefficients 83 that encode information contained within signals 81 so as to allow signals 81 to be reconstructed at any later time via the command reconstruction module 61. In the preferred embodiment, coefficients 83 are determined by approximating each command trajectory, for example, trajectory 110 using a set of mathematical basis functions b(t). In simple terms, basis functions b(t) are a set of basic functional building blocks that can be blended together in order to generate a mathematical description of a curve or any other data distributed over space, time or other continuum. There are many ways to construct a set of basis functions b(t). For example if time, t, is the independent variable, a general set of basis functions may comprise the powers of t, e.g. $t^0, t^1, t^2, t^3, t^4, \ldots, t^N$. Another well-known set of basis functions is the Fourier basis, e.g., 1, $\sin(\omega t), \cos(\omega t), \sin(2\omega t), \cos(2\omega t), \ldots, \sin(N\omega t), \cos(N\omega t)$. Every continuous function, in the function space from which the basis functions are derived, including the sets of basis functions described above, can be represented as a linear combination of the basis functions as follows:

$$y^N(t) = \sum_{j=0}^{N} c_j b_j(t) \tag{1}$$

In equation (1), $y^N(t)$ is the approximant of a signal y(t). The N+1 coefficients $c_j$ enable the selected basis functions to be blended together in a way that ensures that the difference between the approximant $y^N(t)$ and y(t) falls within a given tolerance.

The construct of equation (1) provides a mechanism for efficient transmission and storage of spacecraft guidance and attitude control command trajectories 81. This property is a result of the fact that, once selected by a user of the present invention, basis functions $b_j(t)$ remain unchanged regardless of the nature of attitude command trajectories, y(t). Thus, only knowledge of the values of a vector of N+1 coefficients $c_j$ is needed in order to reconstruct the original command signal y(t) at any desired instant in time, t. The problem of transmitting and storing any arbitrary, feasible, command trajectory is thereby reduced to solving, transmitting and storing of a vector of N+1 coefficients since the basis functions $b_j(t)$ that are required for reconstructing y(t) in terms of an approximant $y^N(t)$ may be pre-computed and programmed into the logic of command reconstruction module 61.

In one embodiment of the present invention, the values of coefficients, $c_j$, are selected so as to minimize the approximation error, $y(t) - y^N(t)$, defined as the difference between original attitude command trajectory 81 and reconstructed attitude command trajectory 68, using a measure based on the infinity norm:

$$\|y(t) - y^N(t)\|_\infty = \left\| y(t) - \sum_{j=0}^{N} c_j b_j(t) \right\|_\infty \leq \varepsilon \tag{2}$$

In equation (2), $\varepsilon$ is the smallest real number that satisfies operational constraints as defined by an operator of spacecraft 10. Alternatively, approximation error $\varepsilon$ can be minimized in the least squares sense or by using any other objective function as determined by an operator of the process.

In practice, tolerance $\varepsilon$ in equation (2) can only be met for values of N greater than some minimum value. Hence, the total number of coefficients needed for adequate reconstruction of the original command trajectory via equation (1) depends on how closely it is desired to reproduce the original command trajectory. The minimum value of N required is generally dependent upon the selection of basis functions b(t). Some basis function sets may thus be inappropriate for representing spacecraft attitude command trajectories and may therefore not achieve the desired effect of reducing the amount of data that must be transmitted to and stored on the spacecraft.

The preferred embodiment of the method in accordance with the present invention is to utilize the Lagrange interpolating polynomials as the basis functions for implementing equation (1). Other polynomial basis functions could also be employed. The N-th order Lagrange interpolating polynomial is shown in equation (3), where t is time in seconds or any other time unit selected by a user of the method in accordance with the present invention.

$$b_j(t) = \prod_{i=0, i \neq j}^{N} \frac{t - t_i}{t_j - t_i} \quad (3)$$

Figure 4:
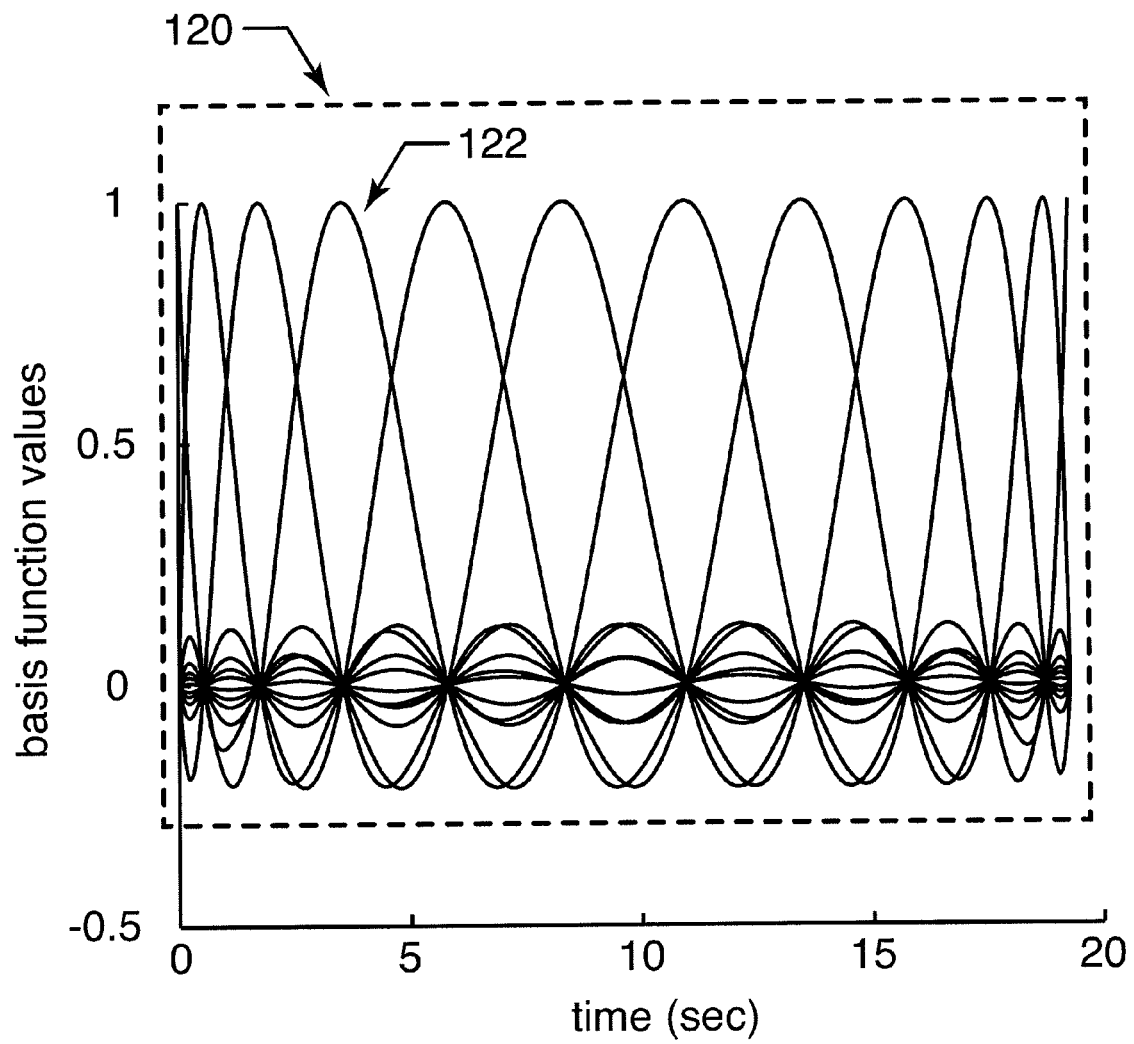
FIG. 4 illustrates 12-th order Lagrange interpolating polynomials evaluated on a time grid of Legendre-Gauss-Lobatto points.

A specific example 122 of Lagrange interpolating polynomials 120 calculated by equation (3) are shown in FIG. 4 for the value of N=12. Additionally, FIG. 4 shows the Lagrange interpolating polynomials as being evaluated on a non-uniform time grid, particularly the Legendre-Gauss-Lobatto grid. It is also noted, however, that any Gaussian distribution of time points can be used to calculate the polynomials according to equation (3). A Chebyshev distribution of time points or other systems of time points clustered at the boundaries of the interval of approximation, i.e., clustered near to and tf, may also be used. Evaluating equation (3) over a non-uniform Gaussian or similar time grid provides the advantage that the well-known Runge phenomenon may be advantageously avoided to improve the accuracy of approximating an attitude command trajectory. The Runge phenomenon occurs when a uniform time grid is used to evaluate equation (3) and describes a situation in which the resulting interpolation polynomial may oscillate wildly between the grid points. Another advantage of utilizing Lagrange interpolating polynomials evaluated on a non-uniform time grid in which time points are clustered at the boundaries of the interval of approximation is that the rate of convergence of approximant $y^N(t)$ given by equation (1) to original function y(t) is extremely rapid as the value of N is increased. Thus, equation (1) may be reliably implemented in practice using relatively small values for N, for example N may generally be selected to be a number much less than 100.

The Lagrange interpolating polynomials also satisfy the Kronecker relationship so that $$y(t_j) = c_j = y^N(t_j) \quad (4)$$

Equation (4) implies that the hereto unknown vector of polynomial coefficients may be determined straightforwardly as the values of attitude command trajectory 81 sampled at the Legendre-Gauss-Lobatto points. If no sample of y(t) is available at time $t_j$ a value of $y(t_j)$ for evaluation of equation (4) may be computed by interpolation (e.g. linear interpolation, spline interpolation, polynomial interpolation, etc.) of available data. It is noted, furthermore, that the Legendre-Gauss-Lobatto points are the zeros of the function $$(1 - t^2) \frac{dP^N(t)}{dt} \quad (5)$$

where $P^N(t)$ is a Legendre polynomial of degree N. The Legendre-Gauss-Lobatto points may be determined using standard techniques by anyone of ordinary skill in the art.

Figure 5:
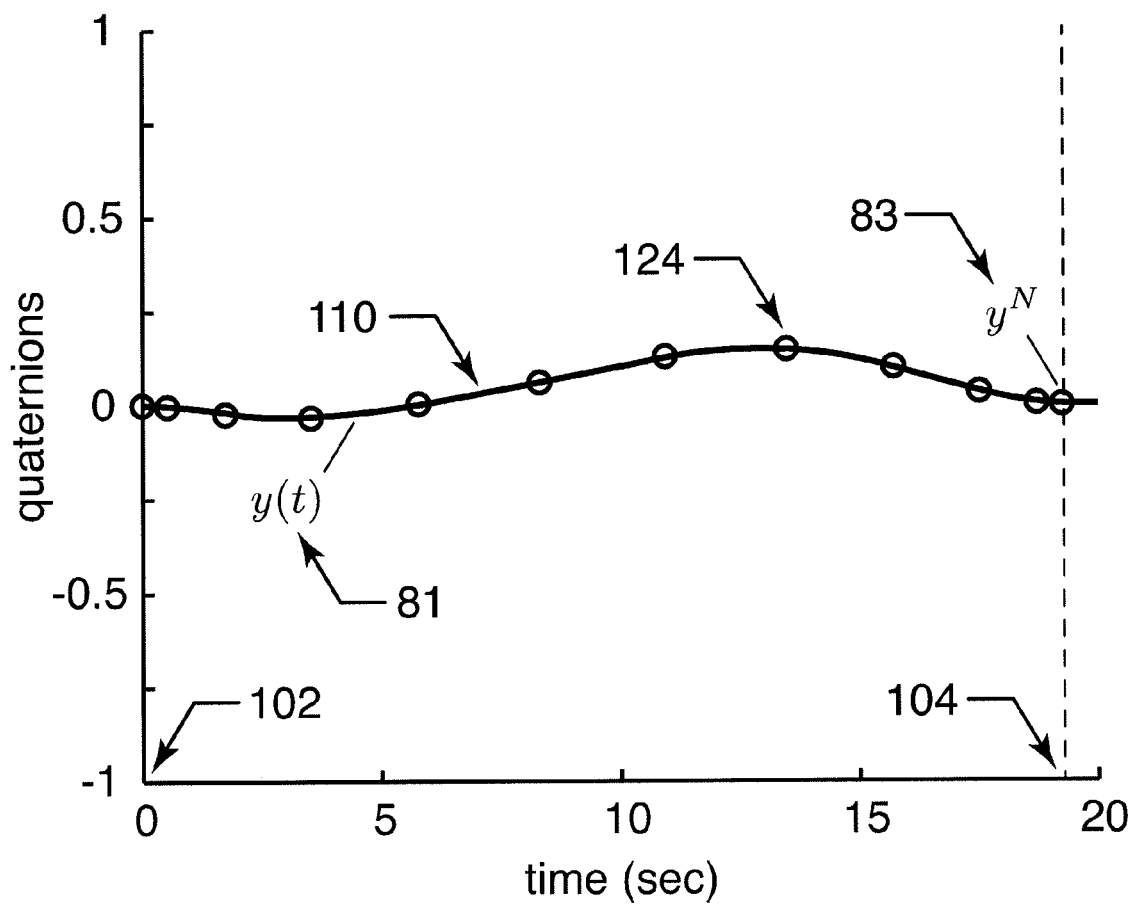
FIG. 5. is a graph showing an exemplary quaternion trajectory and control points used to encode a quaternion trajectory in terms of a vector of polynomial coefficients in accordance with the present disclosure.

By using Lagrange interpolating polynomials evaluated at Legendre-Gauss-Lobatto points equation (2) can be minimized to meet tolerance $\epsilon$ by increasing the value of N until the value of the infinity norm is less than the specified tolerance $\epsilon$. Exemplary values of polynomial coefficients ($y(t_j)=c_j$) 124 are shown in FIG. 5, and are overlaid on example attitude command trajectory 110 for clarity of exposition. Polynomial coefficients for other example attitude command trajectories, e.g., 112, 114, and/or 116, are similar and are obtained in a similar fashion by minimizing equation (2) to meet tolerance $\epsilon$. Coefficients 124 encode the entire time history of an attitude command trajectory by capturing only relevant information about the signal and allowing any non-essential information to be eliminated. Therefore using coefficients of the type of 124, only a vector of dimension 12 for each of four exemplary quaternions, plus initial time 102 and final time 104 need to be transmitted over link 90 and stored in spacecraft memory buffer 40 in order to implement example maneuver 100. This is in contrast to the comparatively large number of data points that would have to be transmitted and stored if the command trajectories are sampled at the rate demanded by attitude control system 20.

Figure 6:
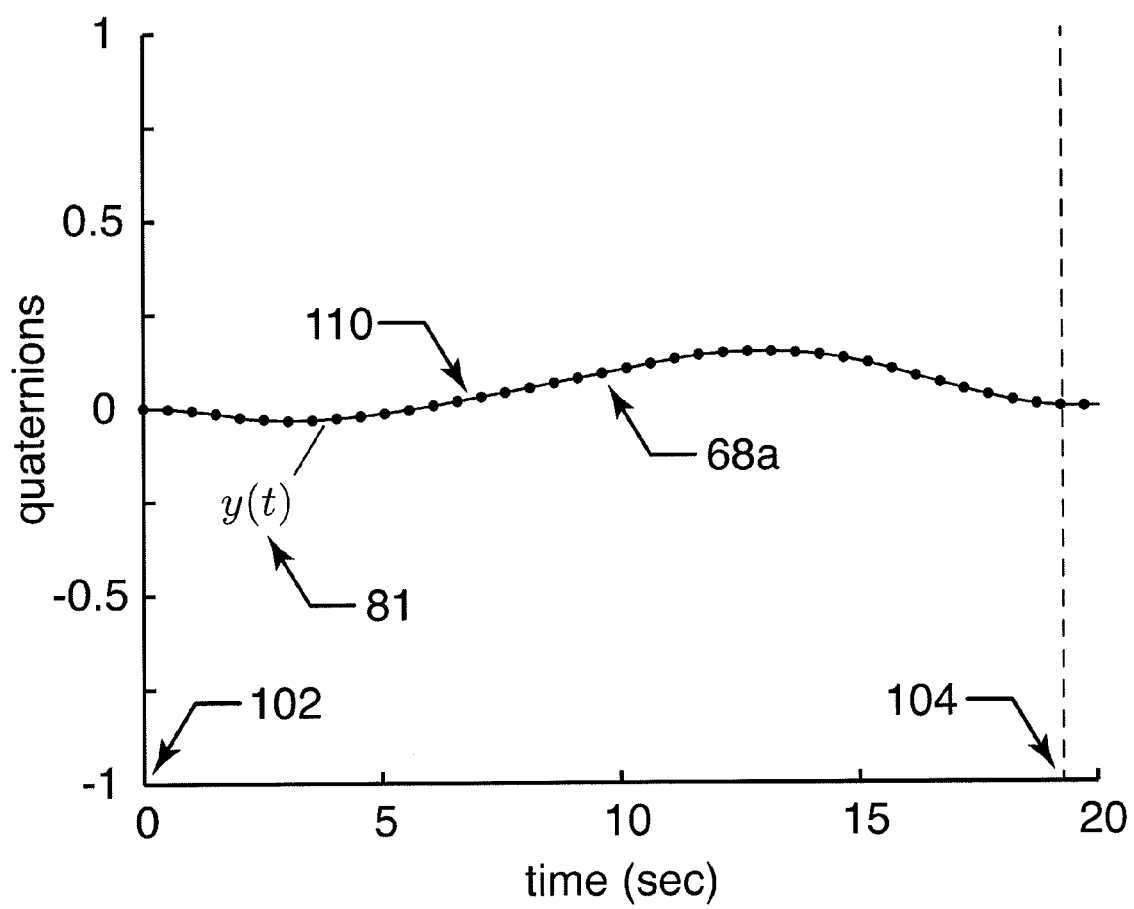
FIG. 6. is a graph showing an exemplary quaternion command trajectory that has been reconstructed at an exemplary sample rate of a spacecraft attitude control system for implementation of an attitude maneuver in accordance with further aspects of the present disclosure.

The result of the application of command reconstruction module 61 for decompressing an attitude command trajectory is shown in FIG. 6. Reconstruction of intermediate command points is done by applying equation (1) using Lagrange interpolating polynomials, for example 120, as the basis b(t) along with a vector of polynomial coefficients $c_j$, for example 124. In FIG. 6, a reconstructed attitude command trajectory 68a, forming a part of a plurality of attitude command signals 68, is generated at rate of 0.5 Hz for the purpose of the present exposition. A signal similar to 68a may be reconstructed at any other sample frequency defined by 29, including, but not limited to, the sample rate of attitude control system 20 and/or servo rates of actuators 50 in a similar fashion. FIG. 6 also shows an original command trajectory 81a, taken from a plurality of attitude command trajectories provided by 81, with reference to reconstructed attitude commands 68a. It is clear from the illustration that original command trajectory 81a can be properly reproduced using the command reconstruction module 61 executing method steps in accordance with the present invention.

In the preferred embodiment of the present invention, command trajectories 81 are computed as the output of an optimal control solver embedded within maneuver generator 80. An optimal control solver is a processing device, which may embody any of a variety of computational, numerical or analytical methods, that generates a maneuver to maximize or minimize an objective function selected by the user, (e.g., a means for generating a trajectory that minimizes the time required to complete the maneuver). An optimal control solver may generally employ any of a number of different methods and/or procedures, familiar to those of ordinary skill in the art, to generate an attitude maneuver. Such methods and/or procedures may include, but are not limited to, shooting methods, multiple shooting methods, collocation methods, and/or Pseudospectral methods. In the case of an optimal control solver employing Pseudospectral methods, attitude command trajectories 81 may already be given in a polynomial form as outputs from maneuver generator 80. In this case, the values of the polynomial coefficients may already be known, in accordance with equation (4), to the user of the process from the output of the optimal control solver and do not need to be solved separately. Therefore, the function of the maneuver generator 80 and the command reduction module 82 may be combined in certain embodiments. In such instances, the values of polynomial coefficients 83 can be obtained without the need to solve equation (2) and the accuracy of the polynomial approximation will be dictated instead by the tolerances on the accuracy of the Pseudospectral method implemented in a combined module comprising 80 and 82.

When the original command trajectories are given in the form of a Lagrange interpolating polynomial, coefficients ($c_j$) 124 are the values of the polynomial, $y^N(t)$, at N+1 distinct time points on the interval t∈[t0,tf] such that $c_j=y_j$ as already implied by equation (4). Note that the physical domain t∈[t0, tf] can always be mapped to the domain τ∈[−1,+1] by means of an affine transformation of the form:

$$t = \Gamma(\tau) \quad (6)$$
$$= \left(\frac{tf + t0}{2}\right) + \left(\frac{tf - t0}{2}\right)\tau \Leftrightarrow \tau$$
$$= \Gamma^{-1}(t)$$
$$= \left(\frac{2}{tf - t0}\right)t - \left(\frac{tf + t0}{tf - t0}\right)$$

As a consequence of equation (6), the Legendre-Gauss-Lobatto points or any set of Gaussian points known in relation to interval [−1,+1] may be mapped to any time interval beginning at (to) 102 and ending at (tf) 104. Because the affine mapping provided by equation (6), the Legendre-Gauss-Lobatto points on the interval [−1,+1] may be pre-computed stored or programmed internally as part of the logic of command reconstruction module 61 and need not be transmitted along with vector of polynomial coefficients 83. Only maneuver begin time (to) 102 and maneuver end time (tf) 104 need to be provided to command reconstruction module 61. In order to interpolate an attitude command trajectory using equation (1) where the time grid is stored or programmed on the interval [−1,+1], the clock time at the desired interpolation point, t, can first be transformed from the interval $t_o \le t \le t_f$ to the interval $-1 \le \tau_i \le +1$ by applying the affine transformation provided by equation (6) prior to performing interpolation using equation (1). Alternatively, the time grid expressed over interval [−1,+1] may be expanded over the interval $t_o \le t \le t_f$ by applying the affine transformation provided by equation (6) prior to performing interpolation using equation (1).

In addition, when Lagrange interpolating polynomials are used as basis functions $b_j(t)$ in equation (1), Barycentric interpolation can be used advantageously to reconstruct attitude command trajectories in the form of an input signal 68 to attitude control system 20 at any useful sampling rate 29. In this case, the Lagrange basis polynomials are first written as $$b_j(t) = \ell(t)\frac{w_j}{t - t_j} \quad (7)$$

where the Barycentric weights, $w_j$, are defined to be $$w_j = \frac{1}{\prod_{i=0, i \ne j}^{N}(t_j - t_i)} \quad (8)$$

The quantity l(t) in equation (7) is $$l(t) = (t - t_0)(t - t_1) \ldots (t - t_N) \quad (9)$$

The approximant of each of a plurality of attitude command trajectories 81 can now be evaluated at any time (t) according to $$y^N(t) = \ell(t)\sum_{j=0}^{N}\frac{w_j}{t - t_j}c_j \quad (10)$$

Additionally equation (10) can be applied on the interval $t_o \le t \le t_f$ (as shown in equation 10) or the interval $-1 \le \tau \le +1$ (not shown) as determined by a user of the method in accordance with the present invention by means of the affine transform provided by equation (6).

The advantage of using equation (10) over equation (1) to reconstruct attitude command trajectories 68 is that only O(n) operations are required to evaluate equation (10) if the Barycentric weights are pre-computed and are stored or programmed as part of the logic of command reconstruction module 61. Evaluation of equation (1), on the other hand, requires O($n^2$) operations since the Lagrange basis polynomials provided by equation (3) must be evaluated individually in order to calculate the value of equation (1) at any time t.

Figure 7:
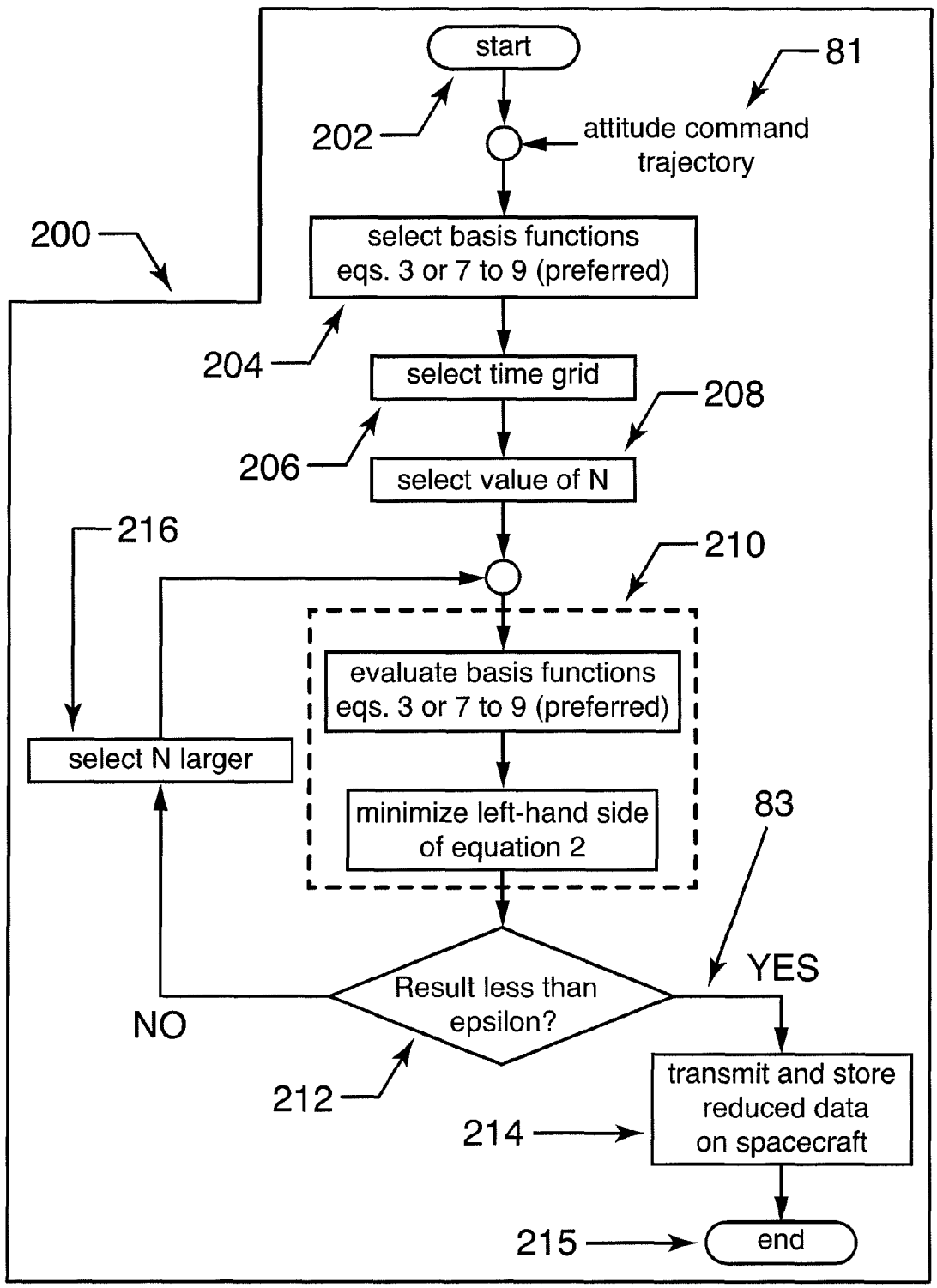
FIG. 7 is a flow diagram illustrating an exemplary method for reducing and encoding an attitude command trajectory as a vector of polynomial coefficients.
Figure 8:
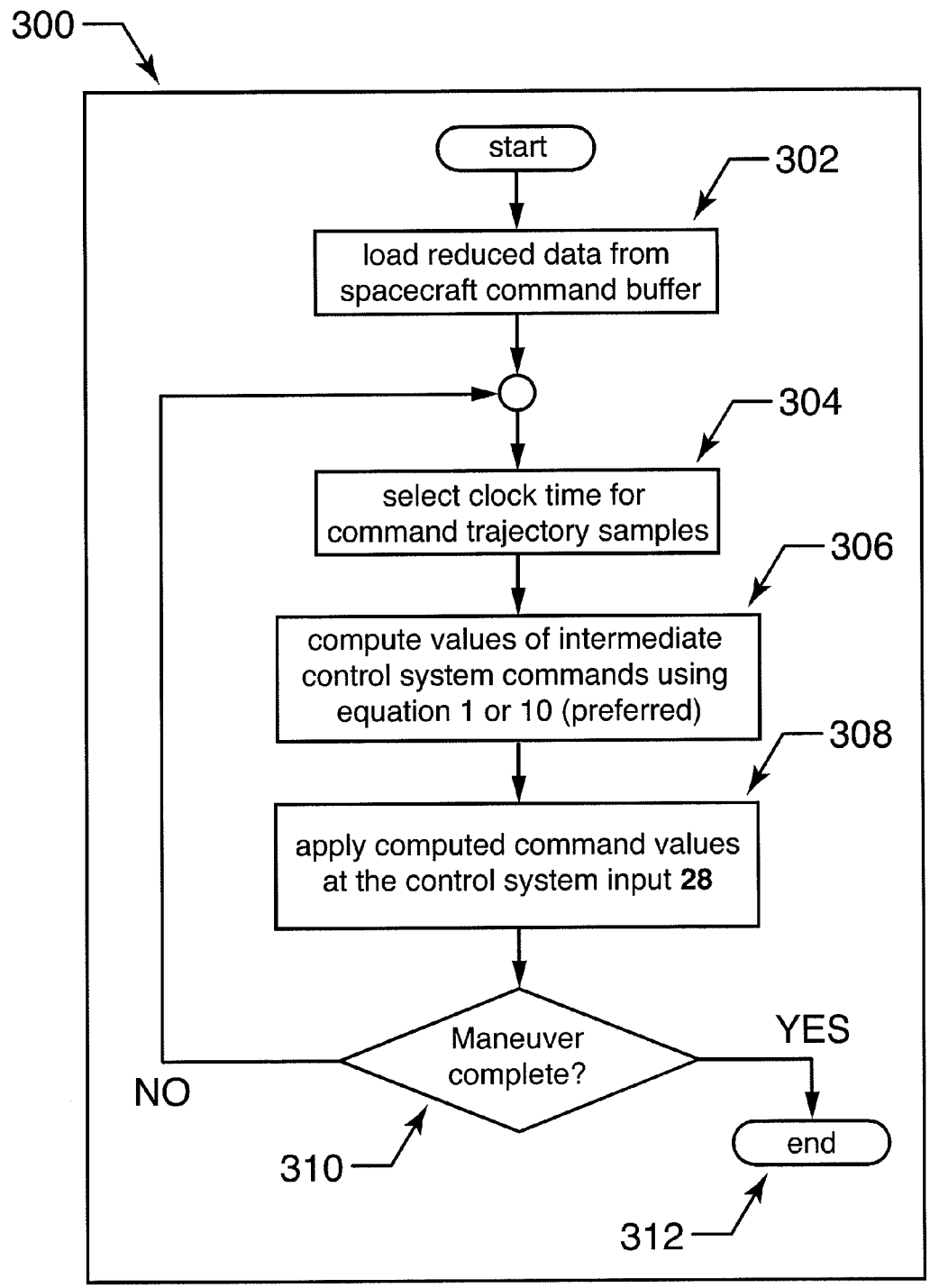
FIG. 8 is a flow diagram depicting an exemplary method for reconstructing an attitude command profile from a vector of polynomial coefficients at any given sample rate.

Flowcharts describing the exemplary procedures for implementing the disclosed processes are summarized in FIG. 7 and FIG. 8. FIG. 7 illustrates a flowchart 200 showing an exemplary method executed by the command reduction module 82. The method begins at step 202 in FIG. 7 with the command reduction module 82 receiving attitude command trajectory 81 as computed by maneuver generator 80 implemented as part of ground-based system 60. In particular, attitude command trajectory 81 is a time history of quaternions, angular rates, angular accelerations and/or other command trajectories that describe the transition of spacecraft 10 from an initial or current attitude at start time 102 to a desired final attitude and time 104 provided by the desired attitude 70. The command reduction module 82 also receives a set of mathematical basis functions, for example, 120 at step 204. In the preferred embodiment step 204 receives N-th order Lagrange polynomials as the basis functions for reducing attitude command trajectory 81 to a set of coefficients 83. At step 206, command reduction module 82 also receives or computes a time grid representing a set or collection of nodes defining the time associated with each polynomial coefficient 124. It is advantageous to utilize the Legendre-Gauss-Lobatto nodes or any other set of Gaussian points as the preferred time grid. The desired number of polynomial basis functions is received at step 208. At step 210 the N basis functions are expanded over the selected or computed time grid and equation (2), or any other objective function describing the accuracy of a polynomial approximation, is evaluated based on computed polynomial coefficients, for example 124, for each of a plurality of attitude command trajectories comprising 81. If Lagrange polynomials are used along with a Gaussian time grid, the values of polynomial coefficients 83 are samples of attitude command trajectories 81 at the Gaussian time nodes as provided by equation (4). If at step 212 the infinity norm is computed to be less than tolerance ϵ, for each of a plurality of attitude command trajectories comprising 81, then attitude command trajectory 81 has been successfully reduced and encoded in terms of N polynomial coefficients 83. At step 214 the results are forwarded for storage in command storage element 72 or transmitted directly to spacecraft 10 via communications link 90. The method of 82 is then completed at 215. If the infinity norm, or other measure of approximation error chosen by an operator of the process, calculated at step 210 is greater than desired tolerance ϵ received at step 212, the value of N is incremented automatically at 216 and the computations at step 210 and test at step 212 are repeated until the desired tolerance is reached or the value of N exceeds a maximum value as specified by an operator of the process or a number of iterations around the loop formed by steps 210, 212 and 216 exceeds a number specified by an operator of the process.

Referring now to FIG. 8, a flowchart 300 showing an exemplary method implemented by the command reconstruction module 61 is illustrated. Beginning at step 302, the command reconstruction module 61 receives a vector or vectors of polynomial coefficients 63 from spacecraft memory buffer 40 when maneuver time (t) derived from spacecraft clock 42 exceeds the maneuver start time 102. For each of a plurality of reduced attitude command trajectories described by the coefficients of vector(s) 63, the current sample time 29 of attitude control system 20 is received at step 304. Alternatively the clock time may be received from spacecraft clock 42. The current time t (to<=t<=tf), is mapped at step 306 to interval [−1,+1] by an affine transform, for example equation (6), and the value of each reconstructed attitude command signal is also computed at step 306 by polynomial interpolation using equation (1) or preferred equation (10), preferred, using polynomial coefficients 63. In the preferred embodiment of the present invention, Barycentric interpolation, equation (10), is used advantageously over other approaches such as the construction of a Vandermonde matrix or Newton's interpolation formula to decrease the number of operations involved in the computation for reconstructing attitude command signals 68. Moreover, in contrast to other methods including Newton's interpolation formula, the computation of Barycentric weights, $w_j$, required by equation (10) may be computed using equation (8), which is independent of the signal to be interpolated. Thus, weights $w_j$ may be pre-computed and programmed as part of the logic of command reconstruction module 61. Another advantage of equation (10) is that reconstruction of an attitude command signal does not depend upon the order in which the points of the time grid are arranged. At step 308, computed values of the attitude command signals are output so that they may be applied at input 28 of attitude control system 20 and/or directly to actuators 50, and/or some combination thereof. At step 310 a test is implemented to determine if the maneuver is completed by comparing the current time (t) derived from spacecraft clock 42 to the desired maneuver end time 104 (tf) provided as part of vector 63. If t<=tf, control returns to step 304 so that the values of the attitude command signals 68 may be computed for application as inputs to attitude control system 20 at the next sample time. Otherwise, if t>tf and the maneuver is deemed to be complete. In this case, the last computed values of the attitude command signals 68 are held constant at input 28 and method 300 terminates at step 312.

As used herein, the term "circuitry" is defined as hardware, software, or a combination of hardware and software, that carry/carries out steps, calculations, etc. to implement functions of the modules described herein. A "module" (e.g., the command reduction module, the command reconstruction module, etc.) as described in the various embodiments in accordance with the present invention may be implemented using circuitry, i.e., hardware elements, software elements, or any combination of both.

Examples of hardware elements may include devices, components, processors, microprocessors, circuits, circuit elements (e.g., transistors, resistors, capacitors, inductors, and so forth), integrated circuits, application specific integrated circuits (ASIC), graphical processing units (GPU), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
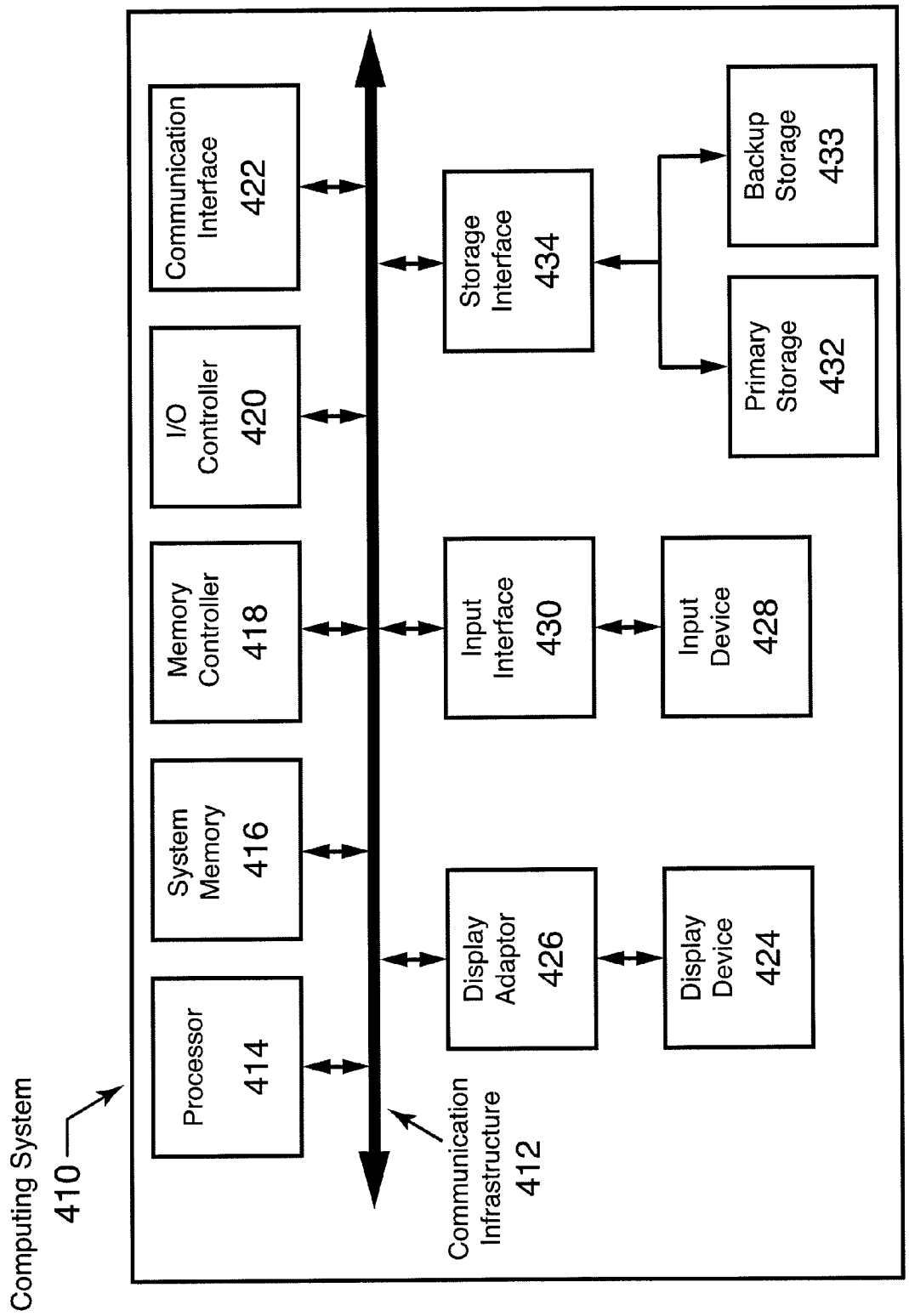
FIG. 9 is a block diagram of an exemplary computing system capable of implementing one or more of the embodiments described and/or illustrated herein.

In a preferred embodiment, a computing system executing software instructions carries out features in accordance with the present invention. With reference to FIG. 9, illustrated is a block diagram of an exemplary computing system 410 capable of implementing one or more of the embodiments described and/or illustrated herein. In the context of the present invention, two computing systems may be utilized to implement a spacecraft command and attitude control system, e.g., a first computing system on the spacecraft and a second computing system remote from the spacecraft, such as a ground-based system.

Computing system 410 broadly represents any single or multi-processor computing device or system capable of executing computer-readable instructions. Examples of computing system 410 include, without limitation, workstations, laptops, client-side terminals, servers, distributed computing systems, embedded computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module, such as an instantiation of a flight software program module or attitude control algorithm. These instructions may cause processor 414 to perform the functions of one or more of the exemplary embodiments described and/or illustrated herein. For example, processor 414 may perform and/or be a means for performing, either alone or in combination with other elements, one or more of the reducing and reconstructing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules of the spacecraft 10 and the ground-based system 60 from FIG. 1 may be loaded into system memory 416.

In certain embodiments, exemplary computing system 410 may also include one or more components or elements in addition to processor 414 and system memory 416. For example, as illustrated in FIG. 9, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as reducing and reconstructing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the reducing and reconstructing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and network including additional computing systems. Examples of communication interface 422 include, without limitation, a wired network interface (such as a network interface card), a wireless network interface (such as a wireless network interface card), a modem, and any other suitable interface (such as RS232, RS422, RS485, CAN, I2C, USB, and/or SPI).

As illustrated in FIG. 9, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 9, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the reducing and reconstructing steps disclosed herein. Input device 428 may also be used to perform and/or be a means for performing other steps and features set forth in the present disclosure.

As illustrated in FIG. 9, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the reducing and reconstructing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 9 need not be present to practice the embodiments described and/or illustrated herein. The devices and subsystems referenced above may also be interconnected in different ways from that shown in FIG. 9. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Moreover, the invention has been explained in the context of a spacecraft attitude control system but it can be used in any system, such as robotic or aerospace systems, in which a command trajectory of intermediate points for application to positional, directional, and/or rotational control system and/or for application to any actuator servo subsystems must be generated from a series of pre-computed or stored setpoints and/or time-varying trajectories. With the benefit of the previous discussion of the invention, one of ordinary skill in the art may be able to modify the invention and the components and functions that have been described in whole or in part without departing from the true scope and spirit of the invention.

What is claimed is:

1. A vehicle guidance system for implementing attitude control of a vehicle, comprising:
   a command reduction module for generating a reduced data set corresponding to a time-varying attitude command trajectory for a vehicle, comprising
      circuitry configured to receive at least one time-varying attitude command
      trajectory defining an attitude of the vehicle, and
      circuitry configured to reduce the at least one time-varying attitude
      command trajectory into a vector of polynomial coefficients; and
   a command reconstruction module for generating data corresponding to the time-varying attitude command trajectory, comprising
      circuitry configured to receive a vector of polynomial coefficients, and
      circuitry configured to reconstruct at least one time-varying attitude command trajectory by utilizing the vector of polynomial coefficients and an affine transformation to perform a polynomial interpolation operation.

2. The system according to claim 1, further comprising a first communication interface located remote from the vehicle and a second communication interface located on the vehicle, the first communication interface configured to transmit the vector of polynomial coefficients to the second communication interface.

3. The system according to claim 1, further comprising:
   an attitude control system including an input for receiving a command trajectory; and
   a switching device including an input operatively coupled to the command reconstruction module, and an output operatively coupled to the attitude control system input, the switching device configured to selectively provide the reconstructed time-varying attitude command trajectory to the attitude control system input.

4. A method for implementing attitude control of a vehicle, comprising:
   receiving at a location remote from the vehicle data corresponding to at least one time-varying attitude command trajectory defining an attitude of the vehicle; and
   using circuitry of a command reduction module located remote from the vehicle to reduce the at least one time-varying attitude command trajectory into a vector of polynomial coefficients.

5. The method according to claim 4 further comprising:
   receiving at the vehicle the vector of polynomial coefficients; and
   using circuitry of a command reconstruction module to reconstruct the at least one time-varying attitude command trajectory by utilizing the vector of polynomial coefficients and an affine transformation to perform a polynomial interpolation operation.

6. The vehicle guidance system according to claim 1, wherein the circuitry configured to reduce the at least one time-varying attitude command trajectory into the vector polynomial coefficients is configured to perform the reduction based on a user input.

7. The vehicle guidance system according to claim 6, wherein the user input comprises at least one of
   an initial maneuver time or an end maneuver time for the vehicle, time histories of vehicle attitude commands,
   a predetermined number N of polynomial coefficients to compute, N being an integer,
   a tolerance for an acceptable polynomial approximation error,
   a set of mathematical basis functions $b(t)$, or
   a set of distinct time points or nodes.

8. The vehicle guidance system according to claim 1, wherein the circuitry is configured to generate a maneuver to minimize or maximize an objective function.

9. The vehicle guidance system according to claim 1, wherein the circuitry configured to reduce the at least one time-varying attitude command trajectory is configured to
   expand N+1 mathematical basis functions $b(t)$ over a selected time grid, compute the values of a set of polynomial coefficients c for N+1 basis functions, and
   evaluate the infinity norm, wherein N is a non-negative integer.

10. The vehicle guidance system according to claim 9, wherein the circuitry configured to reduce the at least one time-varying attitude command trajectory is configured to
   compare the evaluated infinity norm to a predetermined tolerance,
   when the evaluated infinity norm is greater than the predetermined tolerance, increment N and repeat the expansion, and evaluation steps, and
   when the evaluated infinity norm is less than the predetermined tolerance, conclude that the reduction process is complete.

11. The vehicle guidance system according to claim 9, wherein the at least one time-varying attitude command trajectory is represented in the form, $y^N(t) = \sum_{j=0}^{N} c_j b_j(t)$, where $y_N(t)$ is an approximation of the at least one time-varying attitude trajectory having arbitrary accuracy, N is an integer representing a number N+1 of basis functions, $b_j(t)$ denotes the $j^{th}$ basis function, and $c_j$ is a polynomial coefficient for the $j^{th}$ basis function.

12. The vehicle guidance system according to claim 11, wherein values of the coefficients $c_j$ are selected to minimize the infinity norm, $\|y(t) - y^N(t)\| = \|y(t) - \sum_{j=0}^{N} c_j b_j(t)\| \leq \epsilon$, where $\epsilon$ is a maximum tolerance on polynomial approximation error, y(t) is the original time-history of the at least one time-varying attitude command trajectory.

13. The vehicle guidance system according to claim 9, wherein the circuitry is configured to utilize Lagrange interpolating polynomials, $b_j(t) = \prod_{i=0, i \neq j}^{N} t - t_i / t_j - t_i$, as the basis functions.

14. The vehicle guidance system according to claim 1, wherein the circuitry configured to reconstruct the at least one time-varying attitude command trajectory is configured to perform the reconstruction based on at least one of an initial maneuver time for the vehicle, an end maneuver time for the vehicle, an attitude control system sample time, a clock time of the vehicle control system, a set of mathematical basis functions, or a set of distinct time points or nodes.

15. The vehicle guidance system according to claim 14, wherein the circuitry configured to reconstruct the at least one time-varying attitude command trajectory is configured to use Lagrange polynomials as the basis functions $b_j(t)$.

16. The vehicle guidance system according to claim 1, wherein the circuitry configured to reconstruct the at least one time-varying attitude command trajectory is configured to map a current sample time to interval [−1, +1] via an affine transform.

17. The vehicle guidance system according to claim 1, wherein the circuitry configured to reconstruct the at least one time-varying attitude command trajectory is configured to perform polynomial interpolation using the vector of polynomial coefficients and the equation $y^N(t) = \sum_{j=0}^{N} c_j b_j(t)$, where N is an integer representing a number N+1 of basis functions, $b_j(t)$ is the $j^{th}$ basis function, and $c_j$ is polynomial coefficient for the $j^{th}$ basis function.

18. The vehicle guidance system according to claim 1, wherein the circuitry configured to reconstruct the at least one time-varying attitude command trajectory is configured to perform Barycentric polynomial interpolation using the vector of polynomial coefficients and the equation $y^N(t) = l(t) \sum_{j=0}^{N} w_j / t - t_j c_j$, where t is time, $t_j$ is a $j^{th}$ time point, $w_j$ is a Barycentric weight for the $j^{th}$ time point, $c_j$ is the $j^{th}$ polynomial coefficient, N is an integer representing a number N+1 of basis functions, and l(t) is the quantity $l(t) = (t-t_0)(t-t_1) \ldots (t-t_N)$.

* * * * *